United States Patent [19]

Ramamurthi

[11] Patent Number: 5,410,495

[45] Date of Patent: Apr. 25, 1995

[54] APPARATUS, SYSTEMS, AND METHODS FOR DIAGNOSING ANOMALOUS MASS FLOW CONTROLLER OPERATION

[75] Inventor: Krishnamoorthy Ramamurthi, Dallas, Tex.

[73] Assignee: Texas Instruments Incorporated, Dallas, Tex.

[21] Appl. No.: 95,236

[22] Filed: Jul. 20, 1993

[51] Int. Cl.$^6$ ............................................. F16K 31/02
[52] U.S. Cl. ................... 364/511.05; 364/510; 395/61; 395/900
[58] Field of Search ................ 395/900, 175, 61, 912, 395/10, 50; 73/1 R, 3, 861; 364/510, 916.2, 221.3, 571.04, 571.05; 204/296.03

[56] References Cited

U.S. PATENT DOCUMENTS

| | | | |
|---|---|---|---|
| 4,687,020 | 2/1987 | Doyle | 137/486 |
| 4,985,824 | 1/1991 | Husseiny et al. | 364/187 |
| 5,109,380 | 4/1992 | Ogino | 371/15.1 |
| 5,159,547 | 10/1992 | Chand | 364/157 |
| 5,167,005 | 11/1992 | Yamakawa | 395/3 |
| 5,175,797 | 12/1992 | Funabashi et al. | 395/22 |

*Primary Examiner*—Emanuel T. Voeltz
*Assistant Examiner*—Craig Steven Miller
*Attorney, Agent, or Firm*—Douglas A. Sorensen; Richard L. Donaldson; William E. Hiller

[57] ABSTRACT

A processing system (10) includes a mass flow controller (22) operating in response to a plurality of control signals, and a data processor system (40). Data processor system (40) collects and stores data characterizing the plurality of control signals from the mass flow controller (22). Features are extracted from the data which characterizes failure modes of the mass flow controller (22), such as miscalibration and malfunction. Data processor system (40) combines there features represented by membership functions using fuzzy rules to diagnosis anomalous operation of the mass flow controller (22). If the mass flow controller 22 is miscalibrated, the data processor system 40 automatically recalibrates it by the rate-of-nie calibration procedure. In case of malfunction, a warning is raised to the operator. Processing system (10) employs self-learning techniques to initialize and refine the knowledge base.

8 Claims, 7 Drawing Sheets

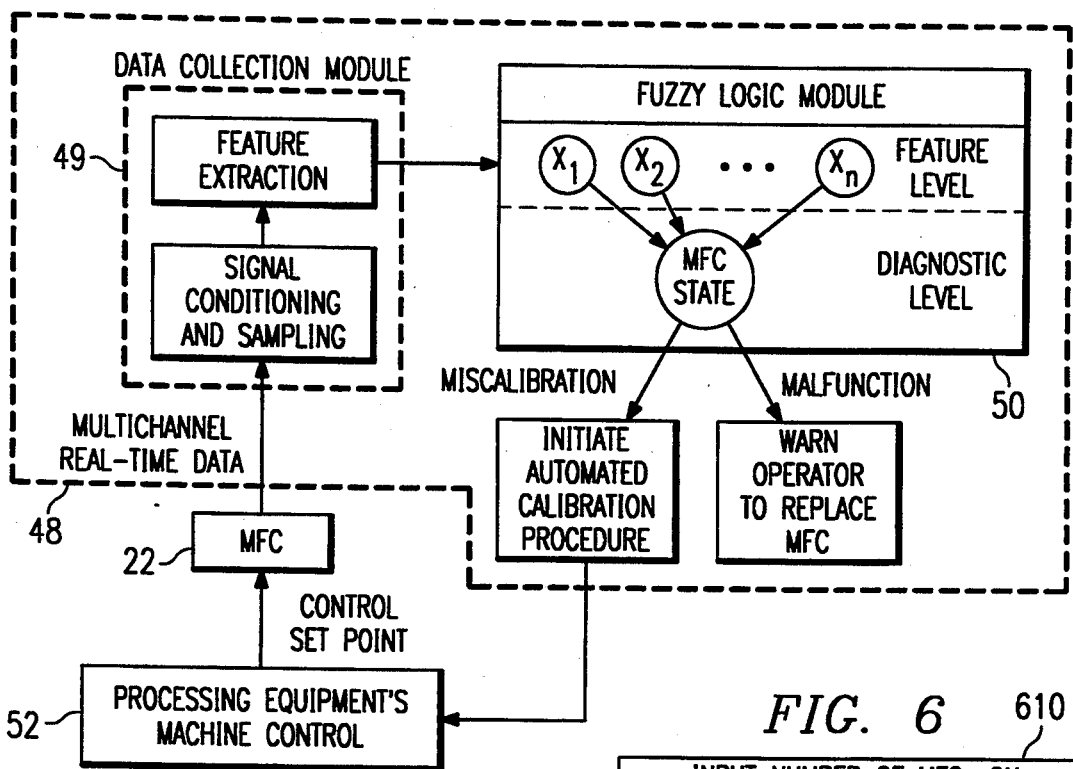
FIG. 4
FIG. 3
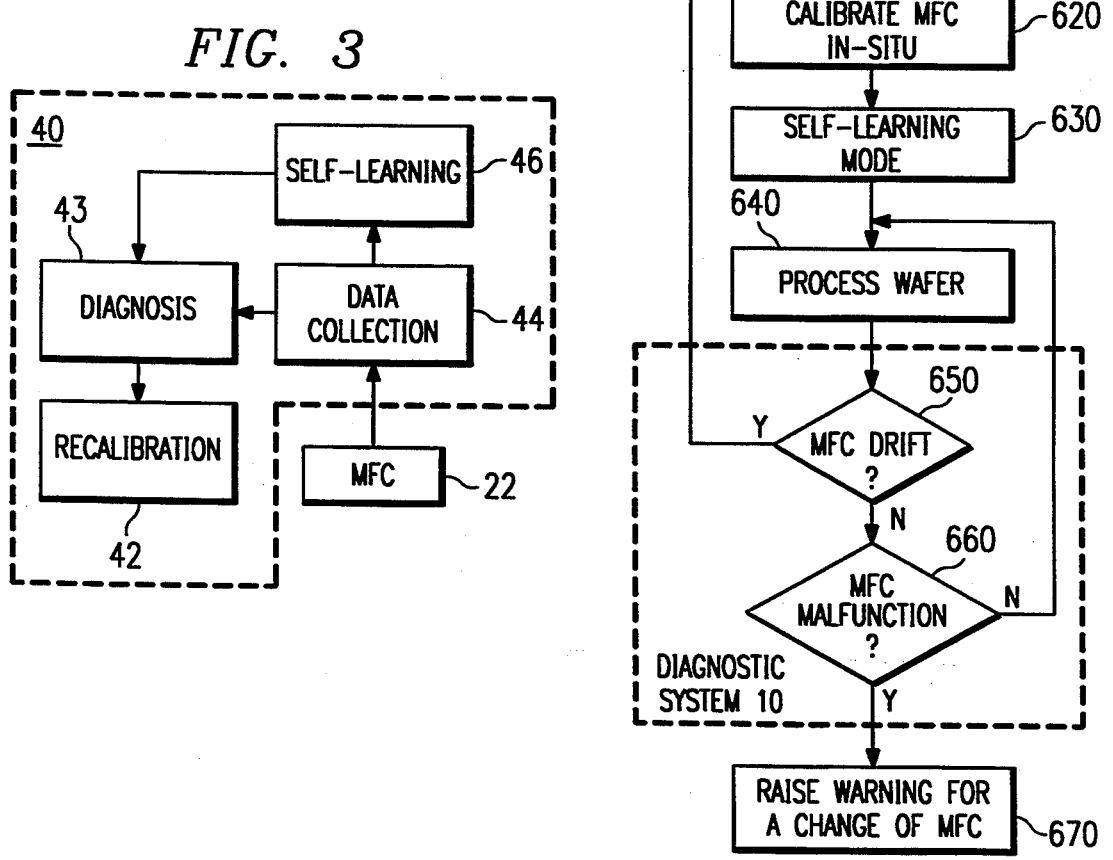
FIG. 6

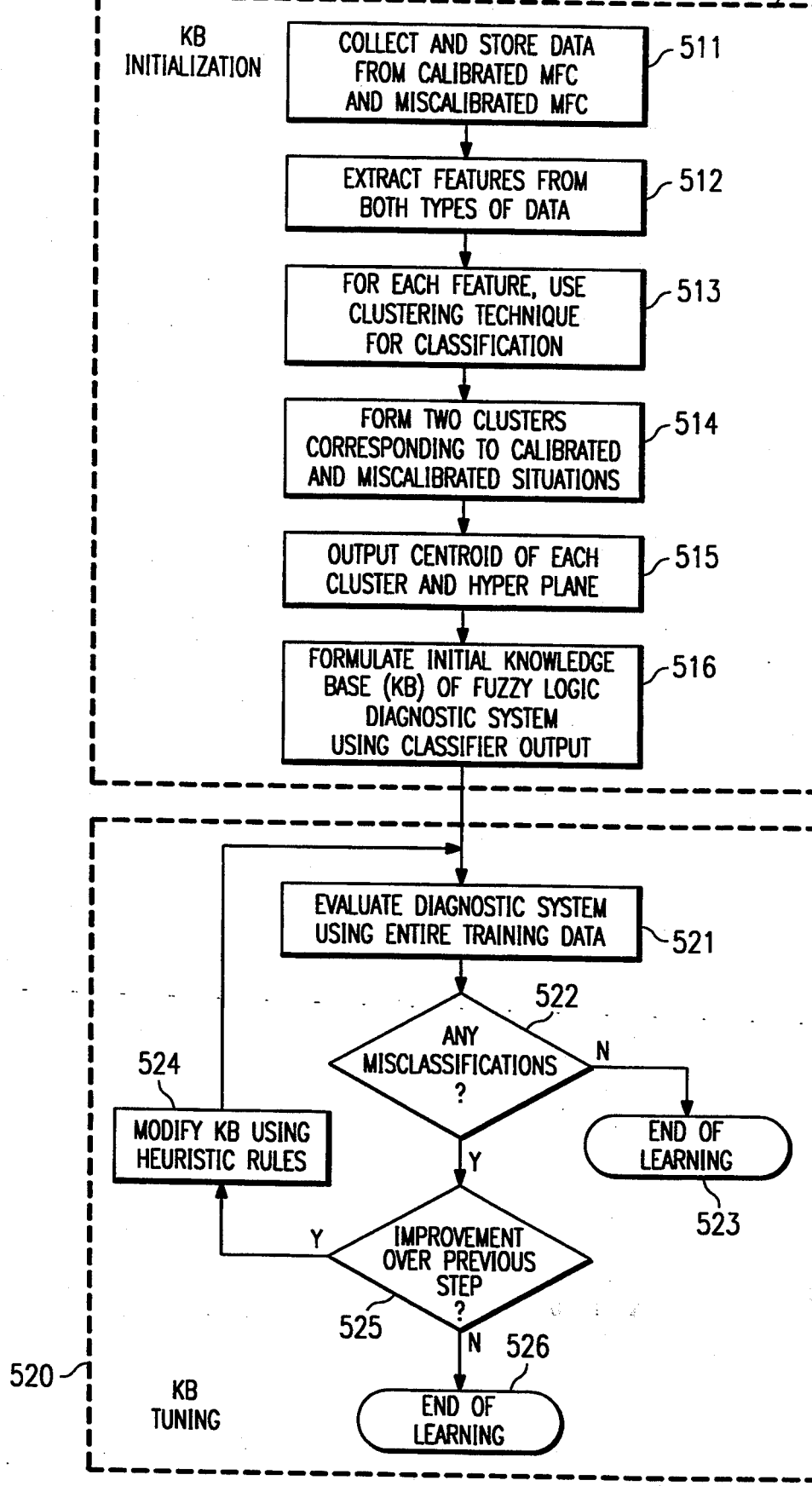

VALVE VOLTAGE RMS (VOLTS)

CHANGE IN VALVE VOLTAGE RMS (VOLTS)

FIG. 15

| STATES OF VALVE VOLTAGE DIFFERENCE (NODE 1) | PARAMETERS OF TRAPEZOIDAL MEMBERSHIP FUNCTION | | |
|---|---|---|---|
| | MIDPOINT | SLOPE | BOTTOM WIDTH |
| POSITIVE MEDIUM | $x_b$ | $1/(0.75\Delta)$ | $3\Delta$ |
| POSITIVE SMALL | $d$ | $1/(0.75\Delta)$ | $3\Delta$ |
| NEAR ZERO | 0.0 | $1/(0.75\Delta)$ | $3\Delta + 2x_g$ |
| NEGATIVE SMALL | $-d$ | $1/(0.75\Delta)$ | $3\Delta$ |
| NEGATIVE MEDIUM | $-x_b$ | $1/(0.75\Delta)$ | $3\Delta$ |

$$\Delta = \frac{(x_b - x_g)}{4} \quad d = \frac{(x_b + x_g)}{2}$$

FIG. 16

| STATES OF FEEDBACK ERROR (NODE 2) | STATES OF VALVE VOLTAGE DIFFERENCE (NODE 1) | CALIBRATION STATUS (NODE 4) |
|---|---|---|
| NEAR ZERO | POSITIVE MEDIUM OR NEGATIVE MEDIUM | 1.0 at 3% 5% 7% |
| NEAR ZERO | POSITIVE SMALL OR NEGATIVE SMALL | 1.0 at 1% 3% 5% |
| NEAR ZERO | NEAR ZERO | 1.0 at −1% 1% 3% |
| POSITIVE OR NEGATIVE | ANY STATE | 1.0 at −1% 1% 3% |

FIG. 17

| STATES OF RISE TIME (NODE 3) | STATES OF FEEDBACK ERROR (NODE 2) | FUNCTIONAL STATUS (NODE 5) |
|---|---|---|
| FAST OR SLOW | POSITIVE OR NEGATIVE | 1.0 at 1 2 3 — 2-DAMAGED |
| FAST OR SLOW | NEAR ZERO | 1.0 at 0 1 2 — 1-TROUBLESOME |
| NEAR ZERO | POSITIVE OR NEGATIVE | 1.0 at 0 1 2 — 1-TROUBLESOME |
| NEAR ZERO | NEAR ZERO | 1.0 at −1 0 1 — 0-NORMAL |

APPARATUS, SYSTEMS, AND METHODS FOR DIAGNOSING ANOMALOUS MASS FLOW CONTROLLER OPERATION

NOTICE (C) Copyright, *M* Texas Instruments Incorporated, 1993. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

TECHNICAL FIELD OF THE INVENTION

The present invention relates in general to semiconductor processing and in particular to apparatus, systems and methods for diagnosing anomalous mass flow controller operation.

BACKGROUND OF THE INVENTION

Semiconductor manufacturing is one of the most complex processes in the manufacturing domain. In order to maintain the quality of finished wafers and good yield, accurate control of the processing equipment is essential to avoid drifts which may alter the process variables. Such drifts may be caused by drifts in the calibration of the mass flow controllers (MFC) which control the introduction of processing gases into the processing chamber, drifts in the calibration of the RF generator, leaks in the process chamber and turbopump malfunctions which result in the lack of pressure control.

Currently, process drifts are typically detected by a post-production examination of processed wafers. Such an after the fact approach is costly, inefficient, and results in the loss of processed wafers. As a result, several on-line approaches to controlling the process variables without drift have been implemented. Each of these currently available approaches however has been subject to substantial disadvantages. For example, recent techniques applied to the problem of controlling semiconductor processing have included first principle based modeling and statistical design of experiments. The first principle models are used for feedback control of selected process variables, for example, uniform temperature control across the wafer in rapid thermal processing. Such automatic control schemes are nonrobust in tuning themselves in response to process drifts introduced by other variables. This problem, however, is addressed by statistical methods wherein the process is modeled as a multivariate regression model. A well-designed experimental test plan and the response surface methodology are combined to identify the optimal set points for all the process variables. The relationship among the variables and the throughput of the process near the optimal region are captured in a multivariate regression model. During production, the actual output of the process is compared with the output of the regression model. Any resulting error, if beyond certain limits, is reduced by suitably adjusting the associated process variables through either feedforward or feedback control. One of the major drawbacks of this technique is the need for enormous amounts of experimental data. The number of experiments increases exponentially as a function of the number of variables as well as the number of variable states (levels). This is irrespective of how efficient the design of the experiment is. Further, for each experiment, a processed wafer must be measured for correlation of the input variables to the process output. In summary, because the data collection is laborious and costly the response surface methodology is not an attractive option, especially for use in factory applications.

A better methodology for process optimization would be process diagnostics, i.e. to diagnose any drift in any process variable and correct its source rather than compensate for it. One of the primary reasons for any drift is a change in equipment state. Artificial (AI) based techniques have been applied for the diagnostics of changes in the equipment state. For example, rule based expert systems have been developed for diagnosing plasma etcher performance using the end point trace. This technique however is an off-line methodology (i.e. an after the fact approach) and further, does not precisely point to the source of the problem but simply indicates that some abnormality exists. Essentially, this approach is inadequate for a process control. The Dempster-Schafer approach to equipment diagnosis has been employed in low pressure chemical vapor deposition and plasma etch reactors. This diagnostic system utilizes maintenance history, real time sensory data, and post-process measurements to diagnose various equipment problems. One of the major limitations of the Dempster-Schafer technique is the conditional independence assumptions in the evidence space as well as the fault space. These assumptions result in an over-assertive diagnosis, i.e. the belief in the result is exaggerated. Further, while this technique has been demonstrated for variables that can be measured deterministically, such as temperature and pressure drifts, it has never been proven for in-situ diagnosis of drifts in uncertain variables like gas flows that are difficult to measure.

SUMMARY OF THE INVENTION

According to the invention, a processing system is provided which includes a mass flow controller operating in response to a plurality of control signals. A data processor system is also provided which collects and stores data characterizing the plurality of control signals from the mass flow controller. Features are extracted characterizing failure modes of the mass flow controller from the stored data. The data processor system then selects for each feature at least one membership function in which the feature has a membership from a knowledge base comprising a plurality of such membership functions. Each membership function in the knowledge base corresponds to a possible state of one of the features. The data processor system then combines the membership function selected for each of the features using fuzzy rules to diagnose anomalous operation of the mass flow controller.

The present invention has significant advantages over presently available mass flow controllers (MFC) diagnosis systems. In particular, apparatus, systems and methods embodying the principles of the present invention allow for in-situ diagnosis of measurement drift and malfunction. The need for costly and inefficient post-production examination of processed wafers is eliminated. Further, by employing the concepts of the present invention, the laborious and costly data collection and analysis required in other techniques is also eliminated. Finally, apparatus, systems and methods according to the present invention precisely point to the source of the anomalous mass flow controller operation such that a remedy can be automatically instituted.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a functional block diagram of a data processing system according to one embodiment;

FIG. 4 is a functional block diagram of one embodiment of the data collection and diagnosis subsystem of the data processing system shown in FIG. 3;

FIG. 5 is a flow chart illustrating the operation of one embodiment of the self-learning subsystem of the data processing system shown in FIG. 3;

FIG. 6 is a flow chart illustrating the combined operation of embodiments of the data collection and diagnosis and self-learning subsystems shown in FIGS. 4 and 5;

FIG. 15 is a tabular representation of the functions shown in FIG. 14 according to one embodiment of the present invention; and FIGS. 16 and 17 are tabular representations of exemplary guidelines for the generation of fuzzy rules with membership functions according to one embodiment of the present invention.

DETAILED DESCRIPTION OF THE INVENTION

The preferred embodiment of the present invention and its advantages are best understood by referring to FIGS. 1-17 of the drawings, like numerals being used for like and corresponding parts of the various drawings.

Figure 1:
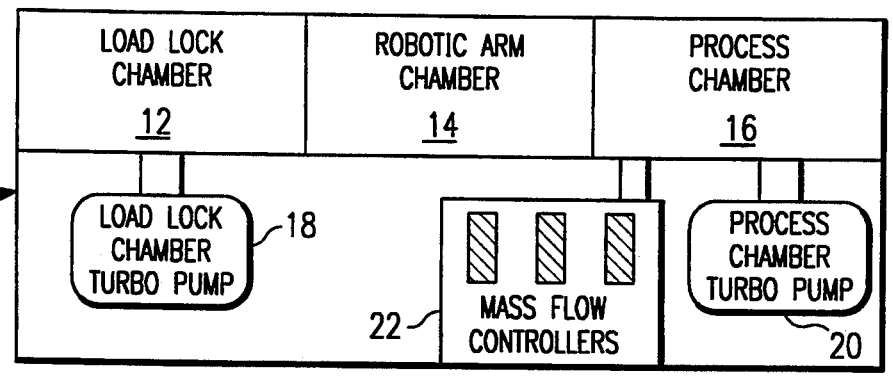
FIG. 1 is a schematic drawing generally depicting a wafer processing system according to one embodiment of the present invention.

FIG. 1 depicts one embodiment of a semiconductor wafer processor system 10. System 10 includes three chambers which are kept under a high vacuum on the order of a fraction of a Torr. Load lock chamber 12 is utilized for loading, storing, and unloading wafers. The wafers undergoing processing are transferred into and out of the load lock chamber 12 in a vacuum cassette, each cassette typically accommodating 25 wafers. A robotic arm in robotic arm chamber 14 moves wafers, one at a time, from load lock chamber 12 to process chamber 16. Associated turbopumps 18 and 20 are provided for evacuating gases from chambers 12 and 16 respectively. Process chamber 16 is associated with one or more mass flow controllers 22.

Figure 2A:
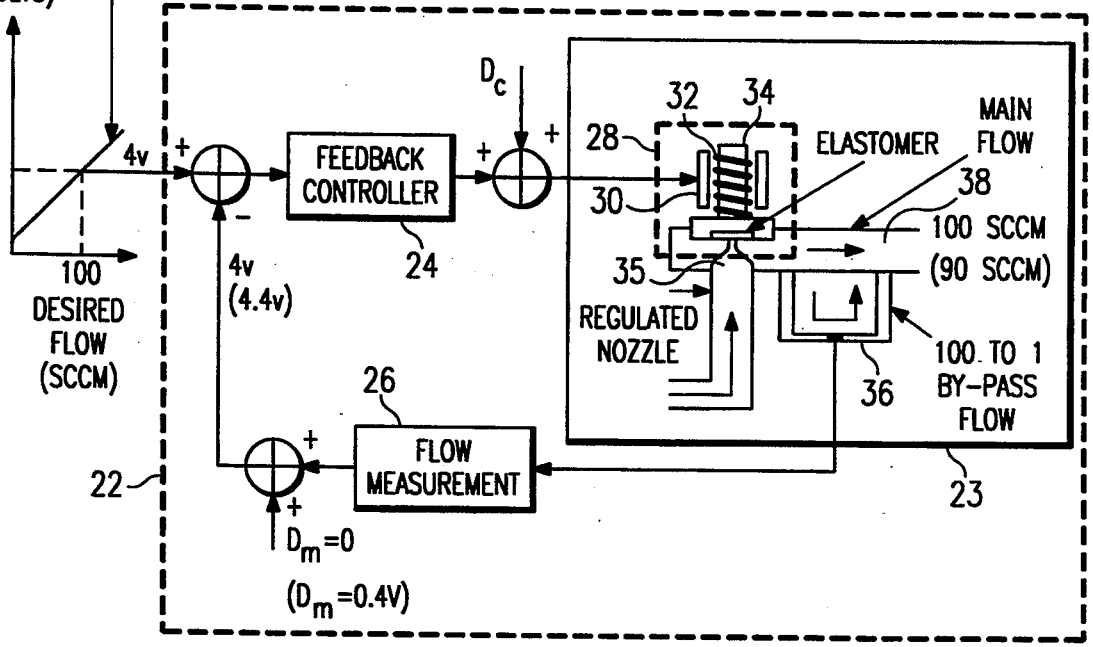
FIGS. 2a and 2b are schematic diagrams depicting a mass flow controller shown in FIG. 1 and associated control circuitry.

The flow of each processing gas into process chamber 16 is controlled by a corresponding mass flow controller 22. It is crucial in a semiconductor wafer processing that the control of the flow of the gases be repeatable within specified tolerance levels. One of the main hindrances to achieving repeatability over a period of time is the drift in the calibration of the mass flow controllers 22. The main source of error stems from the measurement side of a given mass flow controller 22, as illustrated in FIG. 2a. FIG. 2a includes a more detailed diagram of one of the mass flow controllers 22 of system 10, along with its associated control circuitry. Each mass flow controller 22 controls the flow of gases through gas delivering hardware 23 using a feedback controller 24 along with flow measurement circuitry 26 which provides the required feedback. The feedback controller 24 adjusts the position of a spring loaded valve, shown generally by dotted lines at 28, according to the error between the desired flow and the measured flow (the difference between the control set point voltage and the feedback voltage from flow measurement circuitry 26 or "feedback error" is used in the illustrated embodiment to make the required adjustment). Valve 28 includes a solenoid 30, spring 32 and plunger 34 which adjust the nozzle opening 35 through which the gas is delivered. Any minor control disturbance $D_c$, such as changes in the spring characteristics, is compensated by feedback control circuitry 24. For example, assume that the desired flow in standard cubic centimeters per minute (SCCM) is 100. Also, for illustration purposes, assume that a control voltage of four volts corresponds to 100 sccm, based on the manufacturer's specification for the model mass flow controller used, is applied to mass flow controller 22. Under equilibrium, feedback controller 24 delivers the desired flow, provided the measurement disturbance $D_m$ is zero. If, however, $D_m$ is not equal to zero, for illustration purposes, assume 0.4 volts, a negative feedback error causes controller 24 to reduce the flow to 90 SCCM.

The flow measurement is performed by bypass conduit (sensor tube) 36, which in the illustrated embodiment has a ratio of 1:100 with respect to the main conduit 38. Sensor tube 36 measures gas flow based on the principle that the heat loss from a heated wire is proportional to the rate of gas flow through the tube. The bypass path is chosen to ensure that the flow will attain laminar characteristics, a condition necessary when using this measurement technique. The condensation of the gas, deposition of impurities or residues, and corrosion on the inner walls of sensor tube 36 alters the bypass flow. In the illustrated embodiment where sensor tube 36 has a flow ratio of 1:100 with respect to main conduit 38, any minute deviation is magnified approximately 100 times with respect to the main flow thereby leading to erroneous measurements. While other factors such as temperature, inlet pressure, and zero drifts are adequately compensated with suitable electronics, it is difficult to compensate for changes in the characteristics of sensor tube 36 since sensor tube performance typically is a function of many variables, such as period of use, the type of gas, and the gas flow rate.

In order to maintain repeatability, it is necessary to recalibrate each mass flow controller 22 at regular intervals. The effect of recalibration is equivalent to providing compensation for any measurement disturbance. Recalibration can be done in two ways: (1) ex-situ calibration and (2) in-situ calibration. If the first method is used, the mass flow controller 22 must be taken out of processing system 10 and calibrated by comparing its output with that of a reference mass flow controller for the same control set point. In the second method, an automated procedure is performed wherein the mass flow controller 22 is calibrated by measuring and comparing its actual output with the control set point. Actual flow may be measured by performing the "rate of rise" test. In the rate of rise test, gas is delivered at a known control set point for a specific period of time. The change in pressure inside the process chamber during the interval is recorded. With this data, and by knowing the volume of the chamber, the actual flow is computed using the following equation: Actual amount of gas delivered in SCCM=

$$\frac{273}{273 + T} V_c \frac{\Delta p}{\Delta t}$$

where
$\Delta p$ = the change in pressure inside the process chamber
$\Delta t$ is the time taken for the above change in pressure
$V_c$ = the volume of the chamber
T = the temperature of the chamber in Degrees Centigrade.
Equation 1 is derived from the standard gas law of $$\frac{P1 V1}{T1} = \frac{P2 V2}{T2}$$

Figure 2B:
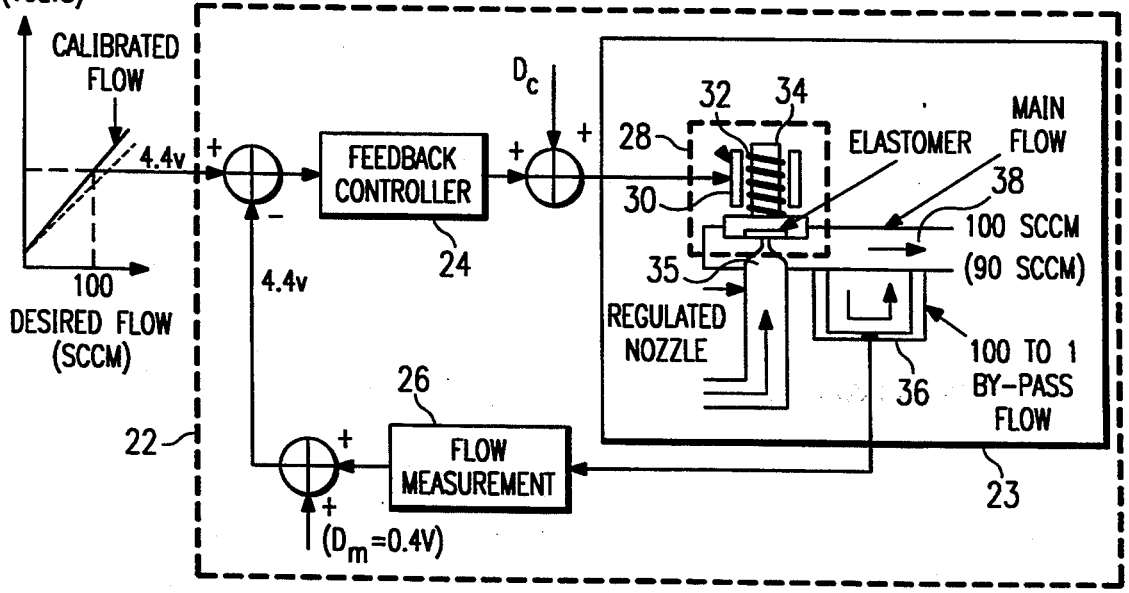

The recalibration results in a different mapping between the desired flow and the control input, as shown in FIG. 2b. During recalibration, each mass flow controller 22 is calibrated for several set points across its entire range of gas flows.

FIG. 3 depicts a functional block diagram of a mass flow controller diagnostic/recalibration system 40 embodying the principles of the present invention. In the illustrated embodiment, system 40 may be based on a data processing system employing an Intel 386 or 486 central processing unit. In the illustrated embodiment, system 40 is configured by software to perform three major functions: (1) recalibration of MFC using rate of rise term; (2) data collection from MFC 22 shown by block 44; (3) diagnosis of MFC 22 shown by block 43; and (4) self-learning shown by block 46 to automatically build the knowledge base used for diagnosis 43.

A fuzzy logic diagnostic subsystem 48 employed as combination of diagnosis function 43 and data collection function 44 using knowledge base built by function 46 is illustrated generally in FIG. 4. During wafer processing, after the stabilization of gas flows and before striking plasma, the fuzzy logic system 48 checks the behavior of the MFCs 22. Selected signals characterizing the operation of a given MFC 22 are conditioned and sampled at a suitable rate. From these selected signals, features that indicate the two failure modes, drift and malfunction, are computed by the data collection module 49 and fed to the fuzzy logic module 50. In the illustrated embodiment rise time, feedback error, and valve voltage have been selected for use in diagnosis of failure. Feature selection and failure diagnosis based thereon will be discussed in detail below. As shown diagramically in FIG. 4, fuzzy logic module system 50 consists of two levels, the feature level and the diagnostic level. The feature level represents all the features that are relevant to diagnosis. The diagnostic level represents all the failure modes of a given MFC 22. By combining these features using fuzzy rules, a diagnosis is made about the MFC 22. If the given MFC 22 is miscalibrated, the system sends a signal to the processing equipment's machine control 52 to initiate the automated calibration procedure based on the 'rate-of-rise' test described above. In case of any malfunction, like loss of control, spring failure, etc., the system alerts the operator that replacement is required. Specific details about the fuzzy rules are discussed below.

The process by which the self-learning function 46 automatically builds the knowledge base is outlined by the flowchart of FIG. 5. Self-learning according to the illustrated embodiment can be divided into two primary subfunctions or phases: (1) a Knowledge Base (KB) Initialization phase shown by the steps enclosed by dotted lines at 510, and (2) a KB Tuning phase shown by the steps enclosed by dotted lines at 520. In combination, these two subfunctions will be referred to hereafter as the "Training Phase". At step 511 KB initialization data is collected from a calibrated and a miscalibrated MFC. In the illustrated embodiment this data includes data which either directly or through computations leads to a determination of rise time, valve voltage, and feedback error data. Both types of data are taken in order to train the system to distinguish between a calibrated and a miscalibrated or failed MFC 22 during performance of the diagnosis function 48.

While obtaining data from a calibrated MFC 22 is a straight forward measurement, for the miscalibrated case, the following procedure may be adopted since it may be impractical to wait for the given MFC 22 to drift to an unacceptable level, say 5% drift, and then collect data. Instead, the effect of the drift is deliberately introduced into the behavior of the MFC 22 by changing the mapping between the control input and the desired flow shown in FIG. 2a. The data collected immediately after this change corresponds to a miscalibrated MFC 22.

Of all the data collected, about 20% of it, the "training set", is used by the learning system for the training phase, and the remaining "test set" is used for testing the overall system. Using the training set, selected features are extracted at step 512 from the calibrated and the miscalibrated MFC data., in the illustrated embodiment, valve voltage, rise time and feedback error. At step 513, a suitable clustering technique is used to form two clusters corresponding to the two classes, calibrated and miscalibrated. Step 513 performed on a feature by feature basis. At steps 514 and 515, the resulting hyper planes and centroids of each class are utilized for formulating the KB. The final outcome of KB initialization phase 510 is a set of fuzzy logic rules to initialize the KB. More specific details about feature selection and fuzzy rule development are provided below.

In the KB tuning phase 520, the diagnostic subsystem 48 is first evaluated at step 521 using the initial knowledge base and the training set. If there are no misclassifications at step 522, the learning is terminated at step 523. Otherwise at step 524 the system modifies the knowledge base using a set of heuristic rules and returns to step 521 and evaluates the system again. These iterations are repeated until either there are no misclassifications at step 522 or there is no improvement over the previous iteration at step 525, at which time the learning is terminated at step 526. The details of the KB tuning phase 520 are also provided below.

One embodiment of present invention employing a combination of the self-learning subsystem 46 and the diagnostic subsystem 48 in a factory (manufacturing) implementation is described by the flowchart of FIG. 6. A preferred embodiment has enough flexibility to accommodate any model MFC 22, any flow rate, and any process system 10 (FIG. 1). At step 610 inputs to the system 40 are provided, which in the illustrated embodiment include the number of MFCs 22 on the processing system 10, and the different flow rates of each one. The flow rate selection is dictated by the various process recipes being implemented by process system 10. At step 620, each MFC 22 is calibrated in-situ using the rate-of-rise test already described above. Next, at step 630, system 40 initiates the self-learning function (subsystem) 46 described above in connection with FIG. 5. In the factory implementation of FIG. 6, the various process recipes are run several times without any wafers in process chamber 16 and the relevant data are collected. From the self-learning step 630, an appropriate knowledge base for each MFC 22 is established (Knowledge base creation is discussed in detail below). Processing system 10 is then ready for processing wafers at step 640. For each wafer, diagnostic system checks the behavior of each MFC 22 at steps 650 and 660 and ensures an accurate flow of gas. In case of any malfunction (failure) at step 660, an alarm is raised at step 670 indicating that the particular MFC 22 being tested requires replacement. If any drift is diagnosed in the MFC 22 under test at step 650, the system initiates the recalibration procedure at step 620, such that drifted MFC 22 is properly calibrated. Since the behavior of the MFC 22 is altered during recalibration, the learning mode of step 630 must be repeated, and the knowledge base for that particular MFC 22 is suitably modified. This cycle is repeated during the entire life of each MFC 22.

The particular aspects of the operation of diagnosis/control system 40 will now be discussed in further detail. In the illustrated embodiment, the signals collected during knowledge base initialization at step 511 (FIG. 5) are: (1) the control set point (FIG. 2), which represents the desired gas flow rate, (2) the feedback response that represents the flow measured by the MFC flow measurement circuitry 26 (FIG. 2), and (3) the voltage across the solenoid valve 28 (FIG. 2) that controls the actual flow. These parameters were selected for the illustrated embodiments based upon the following considerations.

Any gross anomaly in the feedback control scheme (see FIG. 2a), such as the loss of valve spring tension, will be indicated as a large feedback error between the control setpoint and the feedback measurement of the flow. Also, if the spring response is overly damped or exhibits striction due to the contamination from the gases, the result will be a slow feedback control response. Therefore by observing the control set point and the feedback response, gross anomalies in the MFC 22 can be diagnosed.

The third signal selected, the voltage across the solenoid valve, indicates the amount of energy spent in opening the valve against the spring force. This voltage is a function of the actual flow through a given MFC 22. With a properly calibrated MFC 22 and for repeated tests at a given control setpoint, both the valve voltage and the flow will be substantially constant. If however the MFC 22 has drifted out of calibration, the valve voltage will be different for the same control setpoint because the actual flow will differ as a result of miscalibration. The magnitude of the difference in value voltage is a function of the amount of drift in calibration. Therefore, by constantly monitoring the valve voltage, and comparing it against the valve voltage measured for a calibrated MFC at the same control set point, drift can be diagnosed.

The selection of the control set point, feedback response, and valve voltage for implementation of diagnosis/control system 40 can be verified experimentally, such as through the method of the following example. Experiments are performed with a batch of 25 wafers, in conditions similar to those found in actual production. Under each experiment, the 25 dummy wafers are processed one by one using the same process recipe (a batch of 25 wafers is referred as one experiment henceforth). The recipe uses those gases whose corresponding MFCs 22 are under study. The recipe consists of five different steps of differing gas flow durations. To study the whole range of each MFC 22, different flow rates are used in each step. These flow rates may be for example, 20%, 40%, 60%, 80% and 100% of full flow range of each MFC 22. The flow rates and steps are mixed and matched in a random order in the recipe to reduce other stationary effects like hysterisis. No energy source, like RF, is activated since only the MFC data is necessary. The same batch of dummy wafers is used repetitively for each experiment. In an actual production line implementation, it is not necessary to use any wafers. In such a case, mock processing with just the gas flows is sufficient. Such mock processing may be performed with two batches, one with a calibrated MFC 22, and the other with a deliberately miscalibrated MFC 22.

In the present example, a total of 11 experiments are performed, six with calibrated MFCs 22, and five with miscalibrated MFCs 22. The data from one experiment in each case is used for the training phase and the rest are utilized for evaluation. The data collection is initiated as soon as the process chamber 16 is isolated and readied for the start of gas flow. An earlier start of data collection allows study of the transient behavior of a given MFC 22 at the beginning of gas flow. The data collection is stopped as soon as the process chamber 16 is opened for the wafer movement. During this period the signals are conditioned, collected, digitized at 100 Hz sampling frequency, and stored in a memory, such as an optical disk, associated with diagnosis/control system 40 (FIG. 3). In a factory implementation, considerably smaller sampling frequencies, 5–10 Hz, and conventional hard-disk memory would suffice.

The selection of the features, used by fuzzy logic module 50 (FIG. 4) during drift/malfunction diagnosis (FIGS. 5 and 6) is based on the following considerations in the illustrated embodiment. Most of the features are computed using the signals collected, as described above, over a window of 10 seconds after the given MFC 22 reaches steady state. A MFC is defined to be in steady state when the rate of change of its output is close to zero. In this example, only the data corresponding to the gas stabilization phase of the first step of the recipe is utilized. It is assumed here that the MFC would remain in good condition until the end of the process if it is diagnosed as normal just before the first step of the recipe. It should be noted, however, that while this is in fact true in case of drifts, since drifts occur over an extended period of time, this may not be true in case of a catastrophic failure during processing. Such situations could be captured by periodically diagnosing a given MFC 22 for malfunctions alone during processing.

As indicated above, the features selected for the malfunction diagnosis are the feedback error and the rise time. The feedback error is computed as the RMS (Root Mean Square) of the error between the input setpoint and the measured output. In the case of the rise time, the time taken in seconds for the flow to reach 90% starting from 10% of the input setpoint is computed.

Figure 7:
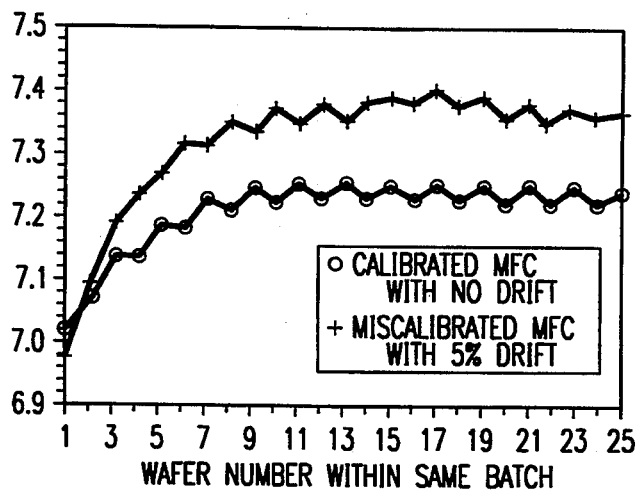
FIGS. 7 and 8 are data graphs depicting experimental data illustrating one possible method of feature selection for use in the fuzzy logic subsystem shown in FIG. 4.

The feature selection for the diagnosis of drift requires additional analysis. The behavior of valve voltage for a given MFC 22 during one batch of wafer processing is shown in FIG. 7. Each RMS valve voltage value is computed using the data within the window discussed above. The circles correspond to the situation where the MFC 22 under test is calibrated. The pluses represent a miscalibrated MFC 22 with 5% drift. In this example, an MFC is considered miscalibrated if the drift becomes 5% since any drift more than 5% is customarily considered unacceptable by semiconductor process engineers. In each case, the valve voltage increases as a function of wafer number (wafer number in FIG. 7 can alternately be viewed as a measure of time). This is contrary to the supposition that the valve voltage would be the same for the same flow. The reason for the upward trend shown in FIG. 7 can be explained as follows. The current supplied to the solenoid of a given valve 28 (FIG. 2) is proportional to the force required to keep the valve open against the spring force. In the steady state, the same amount of current is needed as long as the flow remains the same. Starting from a cold state, however, the solenoid temperature increases as a function of time. As the solenoid temperature increases, the resistivity of the coil increases, and hence a higher voltage must be supplied to pass the same current through the solenoid. This temperature behavior is typical of any electronic component at the beginning of actuation. As shown in FIG. 7 the upward trend continues for the first few wafers and stabilizes to a steady state at the end of the batch.

Figure 8:
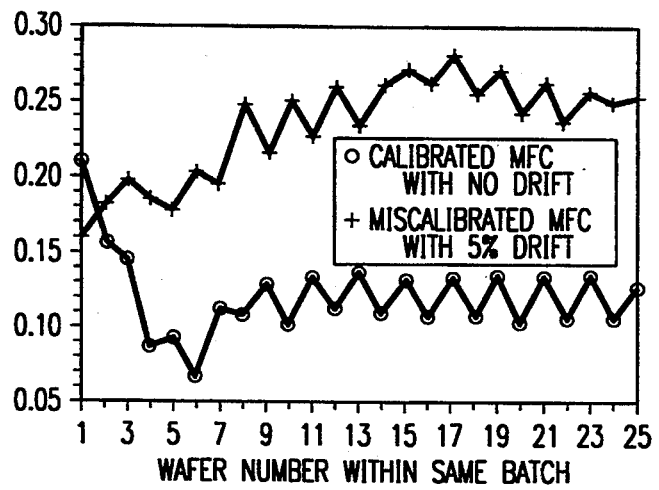

The temperature effect makes it difficult to separate the two classes shown in FIG. 7, i.e., it is not possible to find a threshold value that can separate the two classes. If however, the temperature effect is removed from both the plots, the two classes can be easily separated with a substantial degree of accuracy. The removal of the temperature effect can be accomplished as follows. First, a reference model of the valve voltage is generated using the training data from a calibrated MFC 22 under test. The model consists of two parts: (1) a second order regression function based on the data points from the first few wafers, and (2) the mean of the data points corresponding to the rest of the wafers. The number of points used for generating the regression function is selected based where the upward trend ends and the signal starts showing a random behavior. This point may be determined by applying the statistical run test. In this example, the number of points used for a first MFC 22 (MFC1) is 8, and for a second MFC 22 (MFC2) is 11. For each subsequent batch of wafers, the deviation from this reference model is used as the feature. In FIG. 8, the circles represent the deviation of the calibrated MFC data from the reference model. The pluses indicate the same for the miscalibrated case. It is evident that the deviation of calibrated MFC is closer to zero than the miscalibrated case. This change in the valve voltage RMS is consequently utilized as a feature for drift diagnosis.

Figure 9:
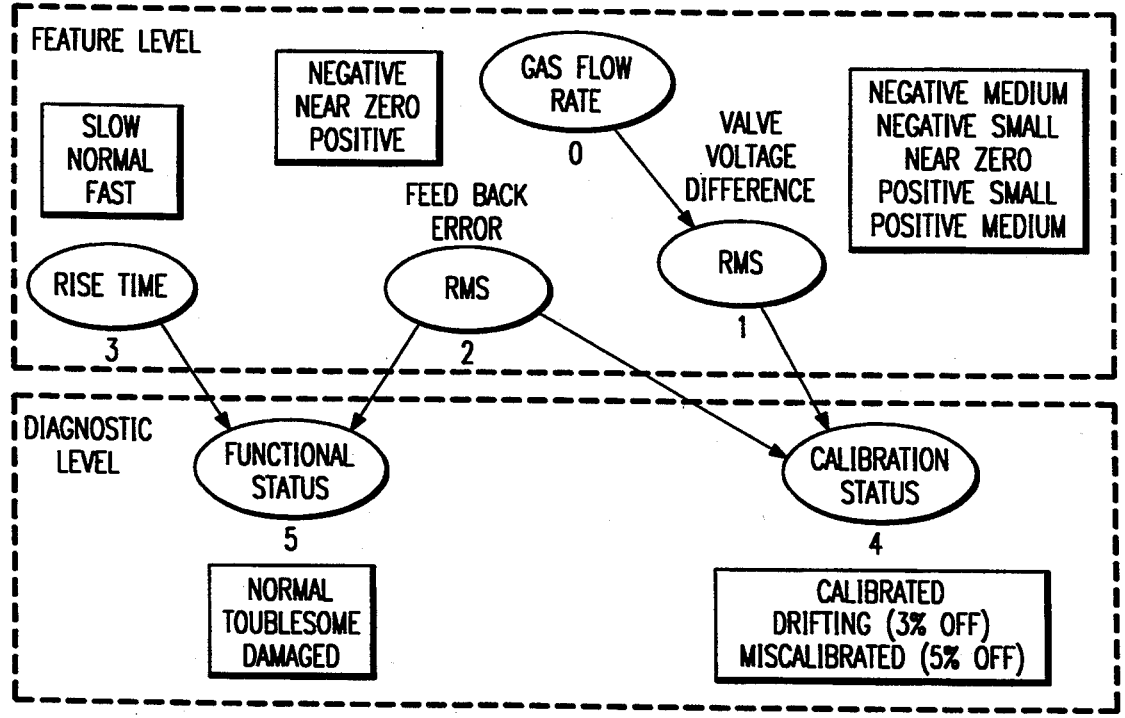
FIG. 9 is a functional diagram further illustrating the operation of one embodiment of the fuzzy logic subsystem shown in FIG. 4.

The various relevant variables and their relationships involved in the fuzzy logic diagnostic subsystem (function) (FIGS. 3 through 6) are represented in a graphical fashion in FIG. 9, which is similar to an influence diagram, except that the quantitative representation is given by membership functions instead of probability distributions. It should be noted that FIG. 9 in essence is a more detailed description of the fuzzy logic module 50 depicted in FIG. 4. These membership functions are included in the knowledge base. Each MFC 22 is associated with a separate knowledge base created by the self-learning subsystem 46. In FIG. 9, the feature level is represented by nodes 0–3, and the diagnostic level is represented by nodes 4 and 5. Since malfunction (failure) is diagnosed from the rise time and the RMS of feedback error, arcs are shown from nodes 2 and 3 to node 5, indicating which variables influence node 5. The states of these nodes are indicated inside the rectangular boxes next to each node (for example, the rise time at node 3 may be categorized as either slow, normal, or fast, as indicated in the rectangular box next to node 3). It should be noted that in the illustrated embodiment, control/diagnosis system 40 checks for the calibration drifts only if the MFC 22 under test is diagnosed to be normal at node 5.

As discussed above, drift diagnosis is based on the RMS of the feedback error and of the valve voltage difference (VVD). Since the VVD depends on the gas flow rate, an arc is shown in FIG. 9 from node 0 to node 1. In the present example, the feedback error should be near zero to obtain meaningful results using the VVD, otherwise, VVD change could be due to a change in flow from feedback control rather than drift. Consequently, arcs are shown from nodes 1 and 2 to node 4. The input to node 0 is determined directly from the recipe under execution which in the present example consists of five states; each state represents a flow specified in one of the recipe steps.

Figure 10:
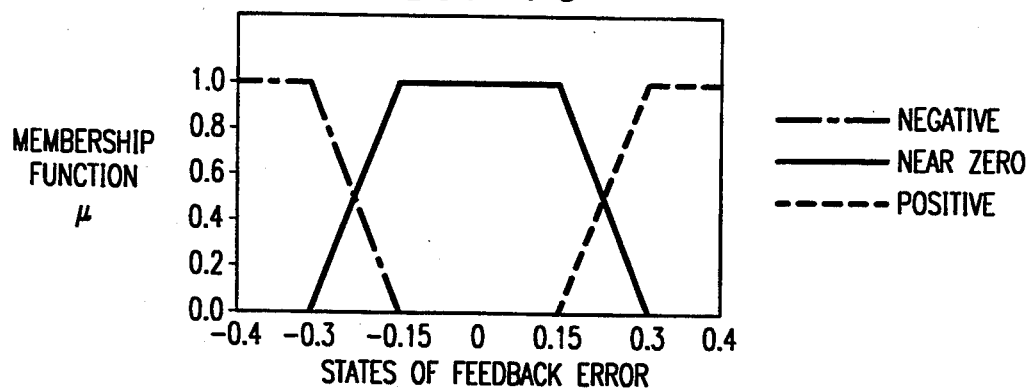
FIG. 10 is a graphical depiction of membership functions of possible feedback error states for use in one embodiment of the fuzzy logic subsystem shown in FIG. 4.

At the numerical level, the states of each node are represented by membership functions. An example is illustrated in FIG. 10 for the states of the feedback error at node 2. The three plots represent the membership function for the three possible states of feedback error shown in FIG. 9, i.e. negative, near zero, and positive. For example, if the RMS of feedback error is 0.225, the feedback error is said to be in state "Positive" with a membership $\mu$ of 0.5, and in state "Near Zero" with a $\mu$ of 0.5. Similar membership functions are used for nodes 1 and 3. Node 0 has a deterministic membership function since its state is known with certainty, i.e. the flow under consideration has a $\mu$ of 1.0, and the rest have 0.0.

Figure 11:
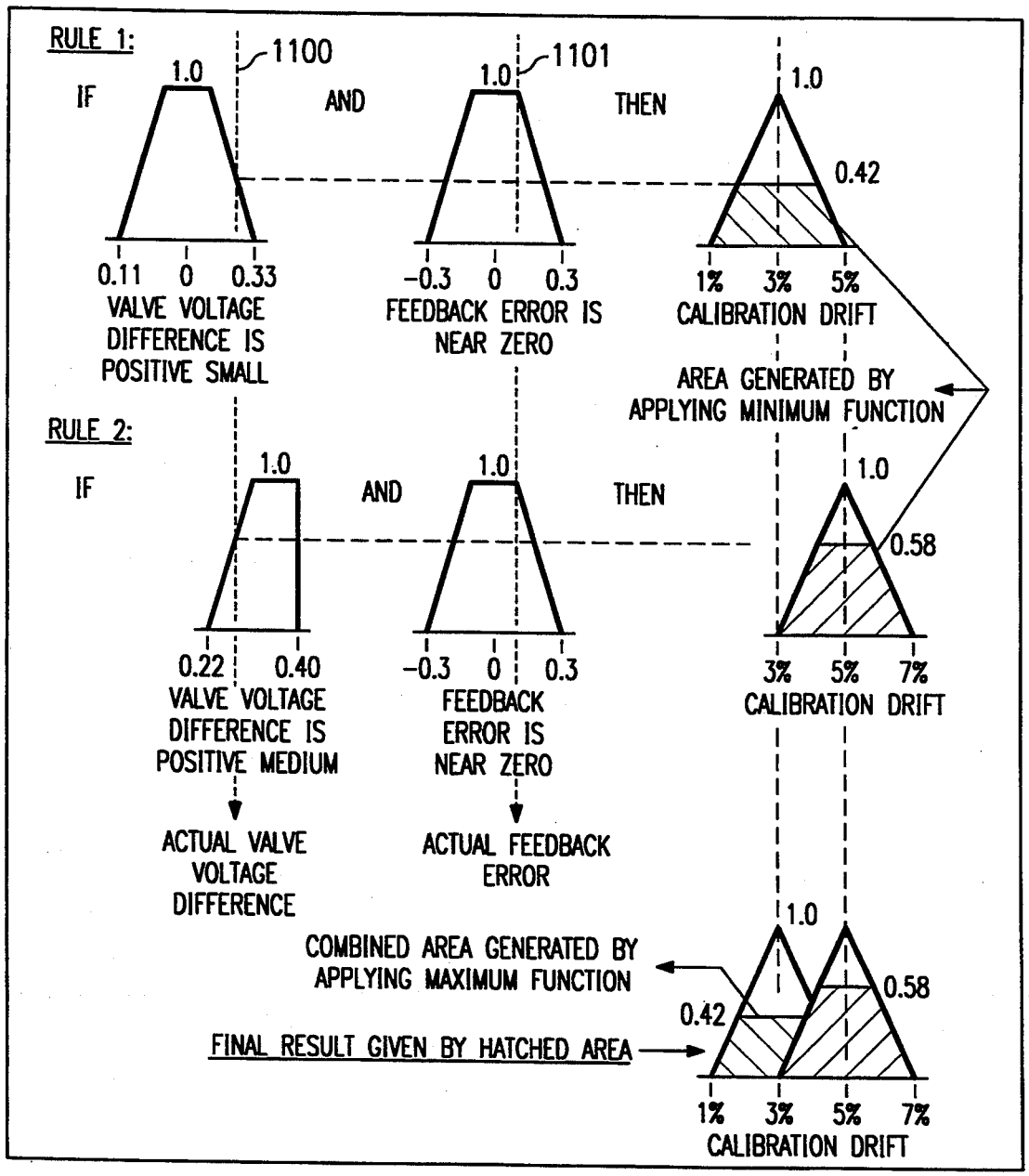
FIG. 11 is a diagrammatic illustration of the manipulation of the membership functions corresponding to the states of selected features of one embodiment of the fuzzy logic subsystem of FIG. 4 using fuzzy rules.

The diagnostic task can be illustrated using information represented by nodes 0 to 3 (FIG. 9), and inferring information about the nodes 4 and 5. This task is performed using fuzzy rules generated and stored in the knowledge base by self-learning subsystem 46. Two such rules are illustrated in FIG. 11. Rule 1 says as follows:

"IF the RMS of valve voltage difference is in 'positive small' state with the shown membership function, AND if the RMS of feedback error is in 'Near Zero' state with the shown membership function, THEN the calibration drift is between 1% and 5% with the shown membership function."

A similar statement is made by rule 2 except that the state of the valve voltage differs in rule 2 from rule 1 and consequently the membership function also differs as shown in FIG. 11. Accordingly, the state and the membership function of the calibration drift is different.

Two functions, the Minimum Function (or MIN function) and the Maximum Function (or MAX function) are used to manipulate the fuzzy rules to arrive at the diagnosis as illustrated in FIG. 11 using the two fuzzy rules explained above. Let the actual RMS value of the VVD and the feedback error be 0.3 and 0.1 respectively. These values are indicated by the vertical dotted lines 1100 and 1101. Using rule 1, the membership that the actual VVD belongs to the "Positive Small" state is 0.42. Similarly, the membership that the actual feedback error belongs to the "Near Zero" state is 1.0. The membership information for the VVD and the feedback error is then combined with an AND operation. The Minimum function is applied following the AND operation (i.e. the minimum of the above two membership values is applied to the calibration drift). In other words, the membership that the calibration drift is between 1% and 5% is 0.42. This is indicated by the hatched area in rule 1.

A similar application of the MIN function for rule 2 produces a slightly different result. For the same experimental values, the valve voltage difference has a membership of 0.58 in "Positive Medium" state, and the feedback error has a membership of 1.0 in "Near Zero" state. Combining them using MIN function results in the calibration drift being between 3% and 7% with a membership of 0.58.

The results of the application of rules 1 and 2 are consolidated to a single outcome by applying the MAX function. First, they are superimposed on each other. As a result, for each point in the state space of the calibration drift, more than one membership value exists. The application of the max function corresponds to selecting the maximum membership value for each point, as is illustrated in FIG. 11. The final result states that the calibration drift is between 1% and 7% with a membership function defined by the hatched area. Further interpretation of this result towards diagnosis is discussed below.

The knowledge base consists of 15 rules for each flow rate for drift diagnosis (i.e., for the five possible states of VVD and three possible states of feedback error, as illustrated in the rectangular boxes FIG. 9) and a total of 9 rules for malfunction diagnosis (i.e. for the 3 possible states of feedback error and 3 possible states of use time, see FIG. 9). In other words, the number of rules in each case is equal to the cross product of the states of each one's predecessor nodes. Generation of these rules is also discussed further below. During diagnosis, the MIN function is first applied to all the corresponding rules, and then the results are consolidated using the MAX function.

Figure 12:
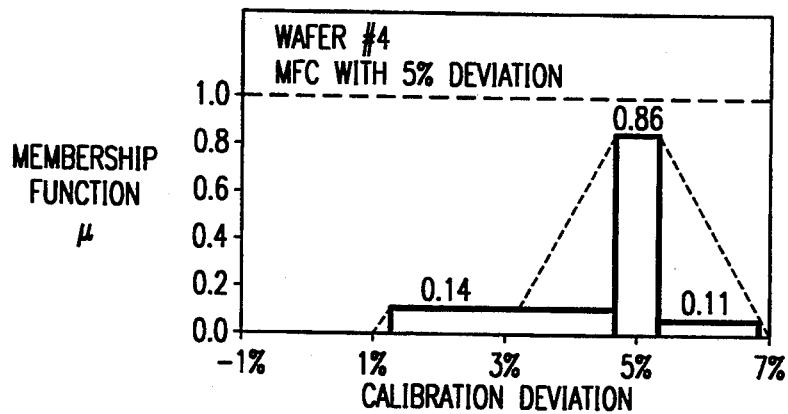
FIGS. 12 and 13 are graphical depictions of two methods of analyzing the final result of the fuzzy rule manipulations pictured in FIG. 11.
Figure 13:
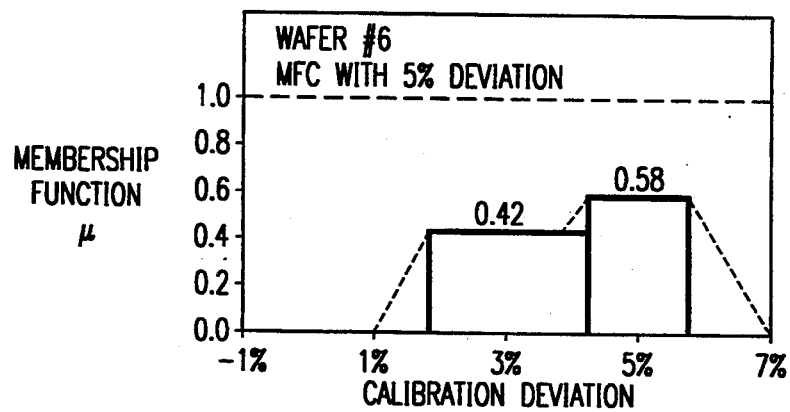

Two different criteria are used to interpret the final result obtained after fuzzy rule manipulation discussed above. These criteria are formulated based on heuristics, and in the illustrated embodiment are: (1) membership criterion, and (2) area criterion. Both are illustrated in FIGS. 12 and 13 respectively. The dotted line in FIG. 12 represents the final result for an experiment with wafer #4 and a miscalibrated MFC. The objective here is to condense the fuzziness in the final result into an unambiguous diagnosis. Hence, the fuzziness indicated by the sloping lines is ignored, and the result is approximated by rectangles as shown. As depicted in FIG. 12, one of the rectangles stands out in comparison to the others, indicating strongly the likelihood of the drift being 5%. In this case, the diagnosis is said to be based on membership criterion. The phenomenon of the likelihood of state i standing out from the others is determined upon two conditions. The first condition holds that the most likely state should have its membership greater than 0.7. The second condition indicates that the ratio of the memberships of the most likely state and the next likely state should be at least greater than 2. Both these conditions are satisfied by the result in FIG. 12. The resulting diagnosis is that the given MFC 22 is miscalibrated with a drift of about 5%.

In FIG. 13, the area criterion is applied since none of the rectangular areas distinctly stands out from the others. As indicated in FIG. 9, the calibration status (node 4) consists of three states, calibrated, drifting with 3% deviation, miscalibrated with 5% deviation. In FIG. 13, the area of the rectangles in and around these states is used for applying this criterion. For example, the area of the rectangle (if any) between 0% and 2% would correspond to the first state (calibrated), the area from 2% to 4% corresponds to the second state (drifting), and the area from 4% to 6% corresponds to the last state (miscalibrated). The final diagnosis is chosen to be that state whose corresponding area is the maximum. Accordingly, in FIG. 13 the final diagnosis is that the given MFC 22 is miscalibrated with 5% deviation.

Figure 14:
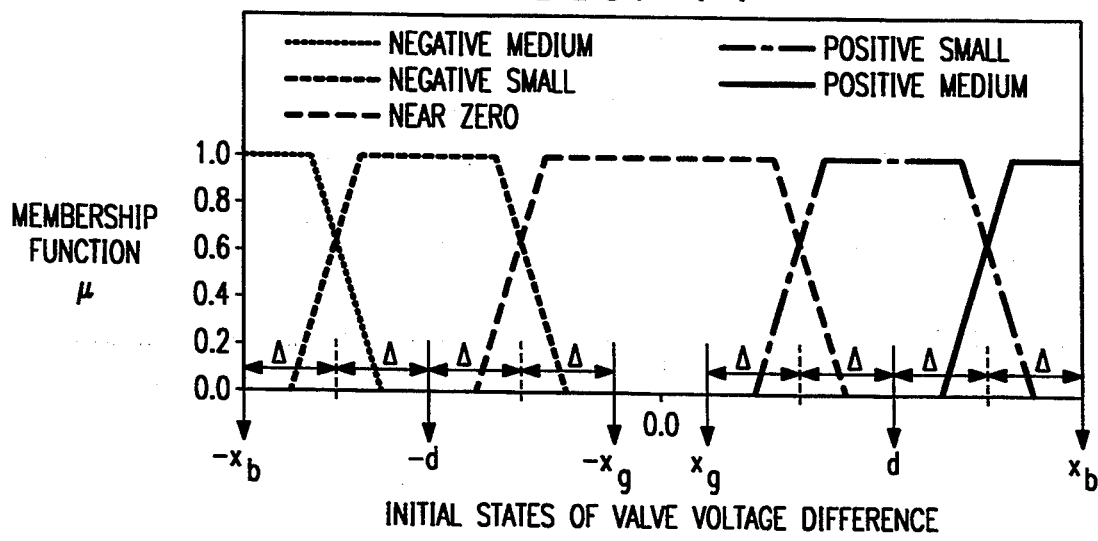
FIG. 14 is a graphical diagram depicting the initial membership functions of the valve voltage difference feature shown in FIG. 9.

Consequently, the two quantities needed for knowledge base initialization (steps 510, FIG. 5) of the self-learning mode (subsystem) 46 are (1) membership functions for feature level nodes (nodes 0-3) and (2) fuzzy rules that provide the membership functions for diagnostic level nodes (nodes 4-5). The membership functions for the feature level nodes are a function of the range of values the corresponding variables attain. In the illustrated embodiment, automatic generation of these membership functions is based on clustering and heuristic rules. The process can be described using the VVD (node 1, FIG. 9) as an example. The first step is to generate two clusters using the training data, one representing the calibrated MFC, and the other representing the miscalibrated MFC. In this example, the K-means clustering technique is utilized for classification. Both clusters together consist of 50 sample points representing two batches of wafers, one batch from each class. The outcome of clustering are the mean of the calibrated MFC cluster, $x_g$, mean of the miscalibrated MFC cluster, $x_b$, and the decision boundary (hyper plane) d, that separates the two clusters. The decision boundary is the mean of the cluster means. Using these values, the membership functions for the five states of node 1 is constructed as shown in FIG. 14. The $\Delta$ is equal to one fourth of the distance between $x_g$ and $x_b$. Each trapezoidal function consists of two sides of equal slope defined by the triplet (midpoint, slope, bottom width). The various parameters defining all the five functions are given in FIG. 15. The system automatically initializes these functions using this table as the guidelines.

A different procedure is adopted for nodes 2 and 3. Since it is difficult or impractical to obtain data for damaged MFC, the clustering technique can not be applied in this case. Under normal operating conditions, the feedback error would be in the 'Near Zero' state. Accordingly, its membership function is generated such that it represents the normal range. For the adjacent states, for example the state "Positive", the membership function is chosen such that it represents the values above the normal range. An overlap with the 'Near Zero' state is provided to represent the smooth transition from the nominal state to the abnormal one. The same procedure is adopted for the node 3. Let the mean of the feedback error RMS based on the training samples be $x_f$. Similarly for the risetime let the mean be $x_r$. The triplets defining the membership functions for the three states 'Negative', 'Near Zero', and 'Positive' of node 2 are respectively $(-3x_f, 1/x_f, 4x_f)$, $(0.0, 1/x_f, 4x_f)$, and $(3x_f, 1/x_f, 4x_f)$. Similarly, for the states "Slow", "Normal", and "Fast" of node 3, they are $(-3x_r, 1/x_r, 4x_r)$, $(x_r, 1/x_r, 4x_r)$, and $(3x_r, 1/x_r, 4xr)$. These are automatically initialized by the system.

The automatic generation of fuzzy rules may be performed using the exemplary guidelines provided in FIGS. 16 and 17. For example, for the combination of the feedback error being in "Near Zero state" and the VVD being in "Positive Medium" state, the system would assign the triangular membership shown in the top row of FIG. 16 for the calibration status. Similar assignments are made for all the combinations constructed from nodes 1 and 2. These assignments are chosen such that for the combination representing the best MFC behavior (third row of FIG. 16, both nodes "Near Zero") the calibration status has a higher membership near the low drift region, and for the combination representing the worst behavior (top row) it has a higher membership near the high drift region. For other combinations in between, its membership is distributed accordingly. Similar assignments are made for the functional status as shown in FIG. 17.

The initial knowledge base developed is modified during the tuning phase (steps 520, FIG. 5) until the system responds in a satisfactory manner. Since there are no adequate cases for verifying the malfunction diagnosis, no modifications are made to the membership functions of nodes 2 and 3. In case of node 1, the modification depends on the type and the severity of error during diagnosis. If the errors are too gross, i.e. if the calibrated MFC is diagnosed as miscalibrated with 5% drift (Type I error) or vice versa (Type II error), no modifications are initiated. This is due to the fact that any modification would not reorganize the clusters sufficiently to cause an improvement.

In case of a minor error, such as when a calibrated MFC is diagnosed as drifting with 3% deviation, the width of the trapezoidal membership function of the "near zero" state (FIG. 14) is increased by 10%. To prevent the fuzziness from growing, the neighboring membership functions are decreased in width by the same amount. Both these operations, in effect, increase the membership of the VVD to the "near zero" state and decreases its membership to the "Negative Small" and "Positive Small" states. If the miscalibrated MFC with 5% drift is diagnosed as drifting with 3% deviation, the width of the membership functions for "Positive Medium" and "Negative Medium" are increased by 10%. As before, their neighbors' membership functions are decreased by the same amount. These modifications are iterated until either the corresponding error is eliminated or the total number of errors show an increase from previous iteration.

Although the present invention and its advantages have been described in detail, it should be understood that various changes, substitutions and alterations can be made herein without departing from the spirit and scope of the invention as defined by the appended claims.

What is claimed is:

1. A method of diagnosing drift in an in-situ mass flow controller comprising the steps of:
   collecting and storing data characterizing a valve voltage, control set point voltage, and feedback signal of the in-situ mass flow controller;
   computing an actual valve voltage difference as a voltage difference between the valve voltage of the in-situ mass flow controller and a representation of valve voltage characterizing a calibrated mass flow controller at the same control set point voltage;
   computing an actual feedback error as a voltage difference between the control set point voltage and the feedback signal;
   selecting for the actual valve voltage difference at least one membership function in which the actual valve voltage difference has a membership from a knowledge base comprising a plurality of membership functions, the selected at least one membership function corresponding to a possible state of the actual valve voltage difference;
   selecting for the actual feedback error at least one membership function in which the actual feedback error has a membership from a knowledge base comprising a plurality of membership functions, the selected membership function corresponding to a possible state of the actual feedback error;
   combining said membership functions selected for said actual valve voltage difference and said feedback error features using fuzzy rules to diagnose anomalous operation of said mass flow controller and;
   recalibrating the mass flow controller when a drift exceeding a preselected level is detected during said step of diagnosing.

2. The method of claim 1 and further comprising the step of generating the knowledge base, said step of generating the knowledge base comprising the substeps of:
   collecting and storing data characterizing valve voltage and feedback signals at selected control set points for a calibrated mass flow controller and an uncalibrated mass flow controller;
   computing valve voltage difference and feedback error values from the stored data corresponding the calibrated and uncalibrated mass flow controllers;
   generating a first pair of clusters from the valve voltage difference data, each cluster of the first pair corresponding to one of the calibrated and uncalibrated controllers respectively;
   generating a second pair of clusters from the feedback error values, each cluster of the second pair corresponding to one of the calibrated and uncalibrated controllers respectively;
   computing a mean for each of the clusters of the first pair and a corresponding decision boundary;
   computing a mean for each of the clusters of the second pair and a corresponding decision boundary;
   generating a membership function for each of a preselected number of possible states of the valve voltage difference from the means and decision boundary computed for the first pair of clusters; and generating a membership function for each of a preselected number of possible states of the feedback error from the means and the decision boundary computed for the second pair of clusters.

3. The method of claim 2 and further comprising the steps of:

identifying any misclassifications existing in said knowledge base; and modifying said knowledge base using heuristic rules to eliminate any misclassifications.

4. The method of claim 1 wherein said step of combining comprises the substeps of:

combining the membership function of each selected possible states of valve voltage difference with the membership function of the selected possible state of feedback error;

applying the MIN function to a result from each combination of membership functions;

applying the MAX function to the results from the application of the MIN function to generate a composite membership function; and diagnosing drift in the in-situ mass flow controller using the composite membership function.

5. The method of claim 1 wherein said step of recalibrating comprises a step of recalibrating based on a rate of rise criterion.

6. A method of detecting anomalous operation in a mass flow controller operating in response to a plurality of control signals comprising the steps of:

collecting and storing data characterizing the plurality of control signals;

extracting features characterizing selected failure modes of the mass flow controller from the data;

selecting for each feature at least one membership function in which the feature has a membership from a knowledge base comprising a plurality of membership functions, each membership function corresponding to a possible state of the feature;

combining the membership functions selected for the features using fuzzy rules to diagnose anomalous operation of the mass flow controller and;

recalibrating the mass flow controller when the diagnosed measurement drift exceeds a preselected amount.

7. The method of claim 6 wherein:

said step of collecting and storing comprises a step of collecting and storing data characterizing valve voltage, control set point voltage and control feedback of the mass flow controller;

said step of extracting comprises a step of computing a valve voltage difference and a feedback error from the stored data;

said step of selecting comprises a step of selecting for each of the valve voltage difference and feedback error at least one membership function from a knowledge base comprising a plurality of membership functions; and said step of combining comprises a step of combining the membership functions selected for the valve voltage difference and the feedback error using fuzzy rules to diagnose measurement drift in the mass flow controller.

8. The method of claim 6 wherein:

said step of collecting and storing comprises a step of collecting and storing data characterizing rise time, control set point voltage and control feedback of the mass flow controller;

said step of extracting comprises a step of computing feedback error from the stored data;

said step of selecting comprises a step of selecting for each of the rise time and feedback error at least one membership function from a knowledge base comprising a plurality of membership functions; and said step of combining comprises a step of combining the membership functions selected for the rise time and the feedback error using fuzzy rules to diagnose malfunction in the mass flow controller.

* * * * *